United States Patent

Bayless, Jr. et al.

[11] Patent Number: 5,554,447
[45] Date of Patent: Sep. 10, 1996

[54] ANTISTATIC COATING COMPOSITION IN A CONDUCTIVE SUBSTRATE AND PROCESS OF MANUFACTURE

[75] Inventors: John H. Bayless, Jr.; Donald K. Johnes, both of Hendersonville, N.C.

[73] Assignee: Sterling Diagnostic Imaging, Inc., Glasgow, Del.

[21] Appl. No.: 463,611

[22] Filed: Jun. 5, 1995

Related U.S. Application Data

[63] Continuation of Ser. No. 79,578, Jun. 22, 1993.

[51] Int. Cl.$^6$ ............................. B32B 27/08; G03C 1/795
[52] U.S. Cl. ........................... 428/483; 430/534; 430/535
[58] Field of Search ................................. 430/271, 534, 430/535; 428/483

[56] References Cited

U.S. PATENT DOCUMENTS

| | | | |
|---|---|---|---|
| 3,923,505 | 12/1975 | Timmerman et al. | 96/1.5 |
| 4,225,665 | 9/1980 | Schadt, III | 430/529 |
| 4,810,624 | 3/1989 | Hardam et al. | 430/528 |
| 4,859,570 | 8/1989 | Miller | 430/271 |
| 4,960,687 | 10/1990 | Cho | 430/527 |
| 5,098,822 | 3/1992 | Tachibana et al. | 430/527 |
| 5,126,405 | 6/1992 | Jones et al. | 525/100 |
| 5,128,233 | 7/1992 | Beisswenger et al. | 430/271 |
| 5,182,343 | 1/1993 | Ono et al. | 526/240 |
| 5,190,815 | 3/1993 | Kobayashi et al. | 428/335 |
| 5,194,327 | 3/1993 | Takahashi et al. | 428/327 |
| 5,198,499 | 3/1993 | Anderson et al. | 525/201 |

FOREIGN PATENT DOCUMENTS

0430110A3  6/1991  European Pat. Off. .

*Primary Examiner*—Robert E. Sellers
*Attorney, Agent, or Firm*—Joseph T. Guy, Jr.

[57] ABSTRACT

A conductive substrate for use in a photographic element comprises a polyethylene terephthalate support coated with 0.01–10 g/m$^2$ of a conductive layer having a low surface energy during coating and a high surface energy after coating which is the reaction product of (i) a conductive crosslinkable polymer with charge carrying groups such as sulfonic acid groups, (ii) a volatile amine and (iii) a crosslinking agent such as a polyfunctional aziridine.

2 Claims, No Drawings

5,554,447

ANTISTATIC COATING COMPOSITION IN A CONDUCTIVE SUBSTRATE AND PROCESS OF MANUFACTURE

CROSS REFERENCE TO RELATED APPLICATIONS

This is a continuing application of U.S. patent application Ser. No. 08/079,578 filed Jun. 22, 1993, pending.

BACKGROUND OF THE INVENTION

1. Field of Invention.

This invention relates to an antistatic coating composition in a conductive substrate and a process for forming the substrate. More specifically this invention relates to improved antistatic compositions which can be coated with a minimal salt content and with minimal or no added surfactant.

2. Description of Related Art.

Permanent antistatic coating compositions are well known in the art. For example, U.S. Pat. Nos. 4,225,665; 4,701,403 and 4,859,570; disclose particularly useful antistatic layers for photosensitive elements. Auxiliary layers for use with antistatic coatings are described in U.S. Pat. Nos. 4,585,730; 4,940,555; 4,891,308 and 5,128,233.

The essential elements of a suitable antistatic coating include an electrically conductive polymer having integral groups which can be crosslinked; a crosslinking, or hardening compound; and an optional, yet preferred, plasticizer.

Widely used conductive polymers are those with a sulfonate, or sulfonic acid, as the charge carrying group and a carboxyl as the group to be crosslinked. These polymers have shown great utility as an antistatic coating yet several problems still exist in practice.

The polymer is typically available in the acid, or low pH form, or in the basic, or high pH form. In the basic form the carboxyl groups and sulfonate groups are predominantly ionic with a counter ion such as sodium or potassium. Due to the ionic charge these materials act as a surfactant in water and lower the surface energy. Several problems occur with basic, or ionic antistatic polymers.

The predominant problem witch the basic, or high pH, form of the conductive polymer is the propensity to grow organisms. This problem is particularly bothersome when the solid conductive polymer must be stored for long periods of time.

Another problem with the basic form of the conductive polymer occurs when subsequent coats are added over the antistatic layer. It is well known in the art that the surface energy of a coating solution must be lower than the surface energy of the surface being coated. Therefore, a substrate with a high surface energy and a solution with a low surface energy is most desirable. Ionic antistatic polymers act as a surfactant, or soap, in solution which is highly desirable for coating. The problem occurs where subsequent coats are applied supra to the ionic antistatic polymer layer. The low surface energy is never lost and therefore any subsequent coating must be applied over a low energy surface which is undesirable. If other layers are to be coated supra to the antistatic layer, e.g., photosensitive layers, the surface energy of each successive layer away from the support must be lowered to facilitate coating. The surface energy of a coating solution is usually lowered by adding low molecular weight surfactants which migrate to the surface and lower the surface energy. Each successive layer must have higher amounts of surfactants to insure a surface energy lower than the previous layer. High levels of surfactant in the finished product are undesirable for a variety of reasons as known in the art.

Yet another problem with the basic, or high pH, antistatic polymers is a decrease in the effectiveness of the crosslinking reaction. It is well known in the art, and exemplified in U.S. Pat. No. 4,960,687 and 4,940,655, that preferred crosslinking reactions proceed most favorably at a pH below about 7.0. Addition of an acid forms mobile salts which often bloom to the surface and interfere with subsequent coatings. This problem is particularly evident with photosensitive layers which typically exhibit poor aging properties due to the salts formed.

Polymers with low salt content are typically the acid form wherein crosslinking groups, such as carboxyls, and charge carrying groups, such as sulfonates, are predominantly protonated. In the protonated form the polymer is less soluble in water and the surface tension of the solution is high due to the low number of ionic groups on the polymer. A solution with a high surface energy is difficult to coat as discussed previously. The problem of high surface energy has been circumvented in the art by the addition of surfactants and other ingredients which are well known in the coating art to lower surface tension and facilitate coating on a support as discussed in U.S. Pat. Nos. 5,094,909 and 5,098,822. Good quality coatings can be obtained in this manner and, in fact, the use of surfactants represents the standard procedure in the art. The surfactants are known to migrate to the surface of the material and, by so doing, lower the surface energy. The use of an acidic polymer coated with surfactants does decrease the effect of salts interfering with subsequent layers. The surfactants are known to migrate to the surface and the problem of low surface energy of the dried film still exist. Each subsequent coating solution must still have a lower surface energy than the layer directly below.

In the acid form the shelf life of the coating solution containing the polymer and crosslinking agent is also a critical problem. As mentioned previously, the activity of preferred crosslinking reactions increases as pH decreases. To counteract premature crosslinking, one must choose a less active crosslinker or use small batches to insure that material is not held long enough to begin crosslinking in the production kettle. Alternatively, the crosslinker can be added just prior to coating, as illustrated in the examples of U.S. Pat. No. 4,810,624. One skilled in the art understands the detrimental effect of polymer crosslinking in the production kettle.

The practitioner has therefore been placed in the unfortunate dilemma of choosing between two undesirable modes of operation. A form of the polymer which is at a high pH, can be used but detrimental salts will be generated. Alternatively, an acid form of the polymer can be used but effective coating requires a surfactant and the solution has poor stability. The practitioner is also in a particular dilemma because either choice yields a coating wherein a surface energy of the dried coating is lower than desired and it is therefore difficult to apply subsequent layers as is often desired in the art.

There has been a long felt need in the art to provide an antistatic coating composition which has a low surface energy at the time of application and a higher surface energy after application and which is void of high levels of salts.

SUMMARY OF THE INVENTION

It is an object of the present invention to provide a composition for coating an antistatic layer on a substrate.

It is a further object of the present invention to provide a coating composition with a low surface energy during the coating process but which has a high surface energy after coating.

It is a further object of the present invention to provide a coating composition with a low level of blooming salts and which can be coated without the use of surfactants or soaps.

It is yet a further object of the present invention to provide a coating composition which is stable as a liquid yet reacts to form a crosslinked polymer film after application onto the substrate.

A feature of the present invention is the capability of being coated at a pH above 7.0.

A particular feature of the present invention is the applicability of the antistatic layer to a photographic element.

Yet another particular feature of the present invention is the improved ability to apply subsequent coats after the layer has been dried.

These and other advantages, as will become apparent to one skilled in the art, are provided in a coating composition for forming a conductive layer on a substrate, comprising: conductive crosslinkable polymer; a volatile amine; and a crosslinking means.

A particularly preferred embodiment is provided in a conductive substrate for use in a photographic element, comprising:

(a) a polyethylene terephthalate support;
(b) 0.01 to 10 g/m² of a conductive layer coated on said support wherein said conductive layer is formed from a reaction product of
    (i) a conductive crosslinkable polymer of formula

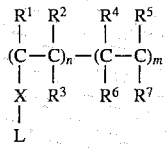

wherein:
X is a divalent linking group;
L is a charge carrying group;
$R^1$, $R^2$ and $R^3$ independently represent hydrogen, alkyl of 1-20 carbons, carboxyl, or alkylamine of 1-20 carbons;
$R^4$, $R^5$, $R^6$ and $R^7$ independently represent hydrogen, alkyl of 1-20 carbons, or a group capable of being crosslinked to form a film with a proviso that at least one of $R^4$, $R^5$, $R^6$ and $R^7$ comprises the group capable of being crosslinked to form a film; and
n and m are chosen such that a ratio n/m is no less than 0.01 and no more than 100:
    (ii) a volatile amine defined by

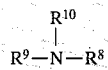

wherein:
$R^8$, $R^9$ and $R^{10}$ independently represent hydrogen, or an alkyl of 1-5 carbons; and
    (iii) a crosslinking agent.

Yet another preferred embodiment is defined by a photographic element, comprising:
a polyethylene terephthalate support;
a conductive layer coated on said polyethylene terephthalate support wherein said conductive layer is formed from an aqueous solution comprising:

a conductive crosslinkable polymer of formula

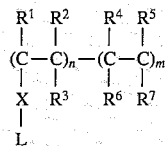

wherein:
X is a divalent linking group;
L is a charge carrying group;
$R^1$, $R^2$ and $R^3$ independently represent hydrogen, alkyl of 1-2 carbons, carboxyl, or alkylamine of 1-20 carbons;
$R^4$, $R^5$, $R^6$ and $R^7$ independently represent hydrogen or alkyl of 1-20 carbons, with a proviso that at least one of $R^4$, $R^5$, $R^6$ or $R^7$ comprise a group capable of crosslinking; and
n and m are chosen such that a ratio n/m is no less than 0.01 and no more than 100; a volatile amine defined by

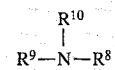

wherein $R^8$, $R^9$ and $R^{10}$ independently represent hydrogen, ethyl or methyl;
a crosslinking agent chosen from a group consisting of:

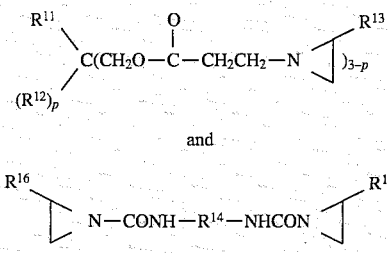

wherein
$R^{11}$ and $R^{12}$ independently represent unsubstituted alkyl of 1-6 carbons, or alkyl of 1-6 carbons substituted with —OH or halide;
$R^{13}$ represents hydrogen or alkyl of 1 to 6 carbons;
p is an integer of 0 or 1;
$R^{14}$ is an alkyl of 2 to 6 carbons;
$R^{15}$ and $R^{16}$ independently represent hydrogen or alkyl of 1 to 6 carbons; and
a photosensitive layer coated on said conductive layer.

A particularly preferred conductive substrate is provided by a process for forming a conductive substrate, comprising:
(a) preparing an aqueous coating solution comprising:
    (i) water;
    (ii) a conductive crosslinkable polymer comprising at least one group defined by

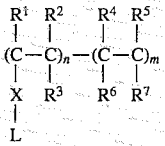

wherein:
X is a divalent linking group;
L is a charge carrying group;

$R^1$, $R^2$ and $R^3$ independently represent hydrogen, alkyl of 1–20 carbons, carboxyl, or alkylamine of 1–20 carbons;

$R^4$, $R^5$, $R^6$ and $R^7$ independently represent hydrogen, alkyl of 1–20 carbons, or a group capable of being crosslinked to form a film with a proviso that at least one of $R^4$, $R^5$, $R^6$ and $R^7$ represents the group capable of being crosslinked to form a film; and n and m are chosen such that a ratio n/m is no less than 0.01 and no more than 100;

(iii) a volatile amine in an amount sufficient to maintain a pH of said aqueous coating solution above 7.0;

(iv) a crosslinking agent comprising at least two groups independently chosen from a group consisting of epoxy, peptide coupler, aldehyde, vinyl sulfone and aziridene;

(b) coating said aqueous coating solution onto a polyethylene terephthalate substrate in an amount sufficient to provide 0.01 to 10.0 g of said conductive crosslinkable polymer per m² of said polyethylene terephthalate substrate; and (c) forming a conductive layer by removing said water and said volatile amine from said aqueous coating solution wherein said removal of said volatile amine decreases said pH of said aqueous coating solution to below 7.0 allowing said crosslinking agent to react with said group capable of being crosslinked to form a film of said crosslinked conductive polymer.

DETAILED DESCRIPTION OF THE INVENTION

The coating composition of the present invention comprises a conductive crosslinkable polymer, a volatile amine and a crosslinking means.

The term "conductive crosslinkable polymer" refers to a polymer comprising at least one charge carrying group and at least one group which is capable of crosslinking. Preferably, the polymer is formed from at least two monomers wherein one of the monomers is substituted with at least one charge carrying group and one of the monomers is substituted with at least one group which is capable of being crosslinked to form a film.

The term "capable of being crosslinked to form a film" refers specifically to a pendent group on a polymer backbone which is capable of reacting stoichometrically with a crosslinking means for forming a rigid network of chemical bonds between polymer compounds. Groups which are capable of being crosslinked to form a film are selected from a group consisting of carboxyls, amines, epoxy groups, aldehyde groups, vinyl sulfones, aziridenes and hydroxyls. Preferred is a conductive crosslinkable polymer which comprises a carboxylic acid group as a group capable of being crosslinked to form a film.

The term "crosslinking means" refers to a means for performing the link between two or more pre-formed polymer chains. Anticipated is a polymer which comprises one substituent capable of reacting with a second substituent on an identical polymer to form a bond. Also anticipated is one polymer comprising a substituent capable of reacting with a substituent on a second polymer to form a bond. Preferred is two separate polymers wherein each polymer has a group capable of being crosslinked and both polymers are in the presence of a crosslinking reagent.

Conductive crosslinkable polymers can be defined by the monomers from which the polymer is derived. A preferred polymer comprises at least one monomer defined by

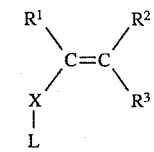

wherein:

X is a divalent linking group;

L is a charge carrying group;

$R^1$, $R^2$ and $R^3$ independently represent hydrogen, alkyl of 1–20 carbons, carboxyl or alkylamine of 1–20 carbons; and at least one monomer defined by

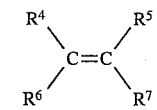

wherein $R^4$, $R^5$, $R^6$ and $R^7$ independently represent hydrogen, alkyl of 1–20 carbons, with a proviso that at least one of $R^4$, $R^5$, $R^6$ or $R^7$ represents a group capable of being crosslinked to form a film. Most preferably at least one of $R^4$, $R^5$, $R^6$, and $R^7$ is carboxyl.

Preferred divalent linking groups include aryl of 6 to 12 carbons; heterocyclic rings of 5 to 13 atoms chosen from a group consisting of C, N, O, S and Se; alkyl of 1 to 20 carbons; alkylaryls of 7 to 32 carbons; and —CONHX²— where X² is an alkyl of 1 to 10 carbons. Particularly preferred divalent linking groups are aryl to 6 to 12 carbons, pyridine, pyrimidine, pyrrole, pyrazine and pyran. The most preferred divalent linking group is aryl of 6 to 12 carbons.

Charge carrying groups are known in the art to include sulfonic acid groups, sulfuric acid ester groups, quaternary ammonium salts, tertiary ammonium salts, carboxyl groups, carboxylic acid groups, and polyethylene oxide groups. Preferred charge carrying groups are chosen from a group consisting of sulfonic acid groups, sulfuric acid ester groups and quaternary ammonium salts.

The term "alkyl" is used herein in a manner consistent with the art to describe a straight chain or branched hydrocarbon group. The term "aryl" as used herein in a manner consistent with the art to describe an aromatic cyclic six-member ring such as a phenyl group or an aromatic 10-member ring such as a naphthalene group. The term substituted alkyl, as used herein, specifically refers to a straight or branched alkyl which is substituted with at least one group such as sulfonate, carboxyl, hydroxyl, halogen, or —OL, where L is an alkyl or substituted alkyl of 1–10 carbons, carbonylalkyl, amine or aryl.

A most preferred conductive crosslinkable polymer of the present invention is defined as

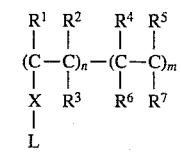

wherein: X, L, $R^1$, $R^2$, $R^3$, $R^4$, $R^5$, $R^6$ and $R^7$ are defined above; and n and m are chosen such that a ratio n/m is no less than 0.01 and no more than 100.

While not limited thereto, particularly preferred conductive crosslinkable polymers are selected from a group consisting of:

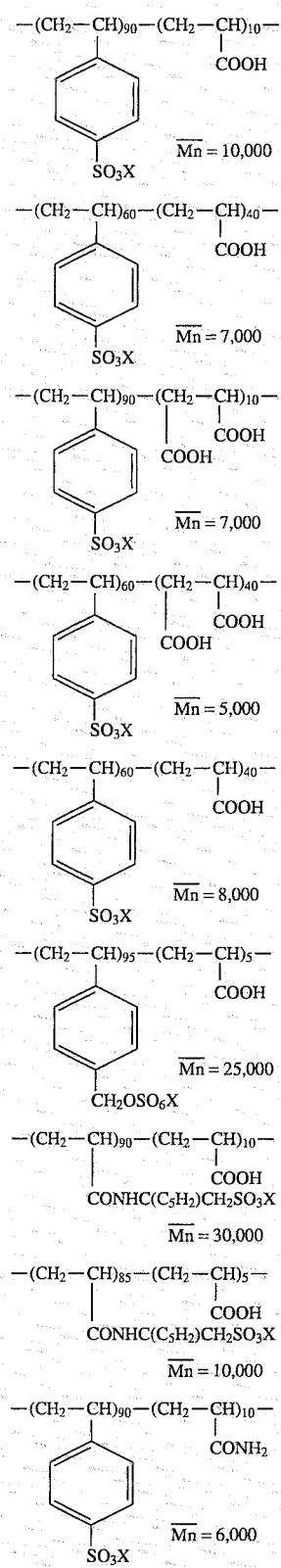

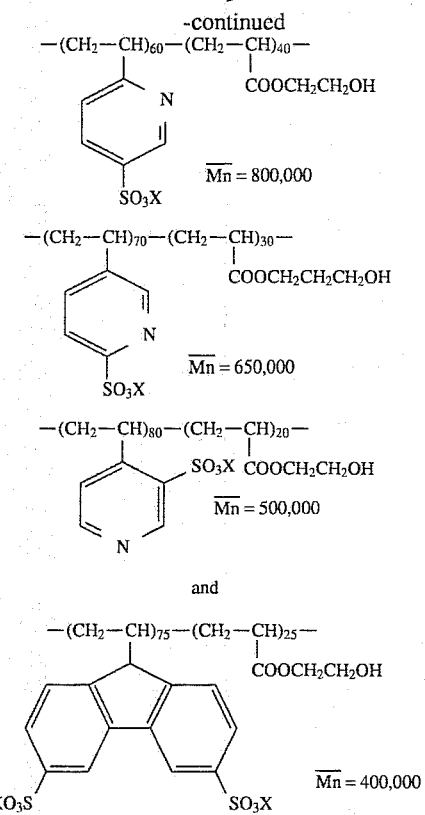

wherein:

X represents H, Na, Li, K, or $NH_4^+$. In the above listed compounds (1)–(21), counterion salts such as sodium, potassium and the like are suitable. The problems associated with salts blooming to the surface are not apparent due to the absence of a mobile anion which is common to the prior art due to the addition of acid which is not necessary in the current teachings.

Other exemplary conductive crosslinkable polymers are the acid form of those listed in U.S. Pat. Nos. 5,045,441 and 5,079,136.

The polymers of the present invention are commercially available or can be synthesized by polymerization of monomers obtained by conventional manner. The polymers should be applied to the support at a level sufficient to provide a dry coating weight of 0.01 to 10 $g/m^2$, preferably 0.10 to 1.0 $g/m^2$.

It is most desired that the polymers are crosslinked to form a rigid coating. Suitable crosslinking agents include epoxy compounds, peptide reagents, aldehydes, vinyl sulfones, aziridine and combinations thereof. It is particularly desirable to use a crosslinking means whose activity is retarded in solutions with a basic pH and active in a solution with an acidic pH. The most preferred crosslinking means is an aziridine.

Preferred epoxy compounds to be used as a crosslinker in the present invention are those containing a hydroxyl group or an ether group. Exemplary teachings of epoxide crosslinkers are disclosed in U.S. Pat. No. 5,098,822.

Particularly preferred epoxy crosslinkers are:

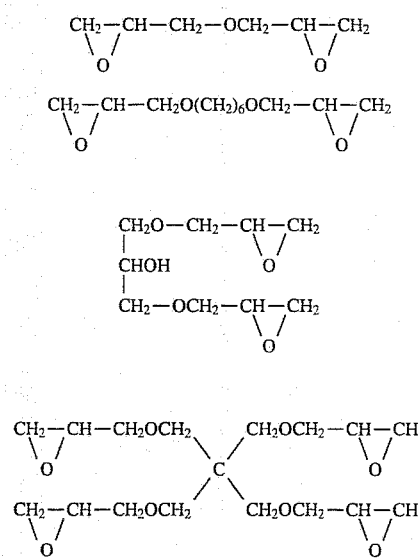
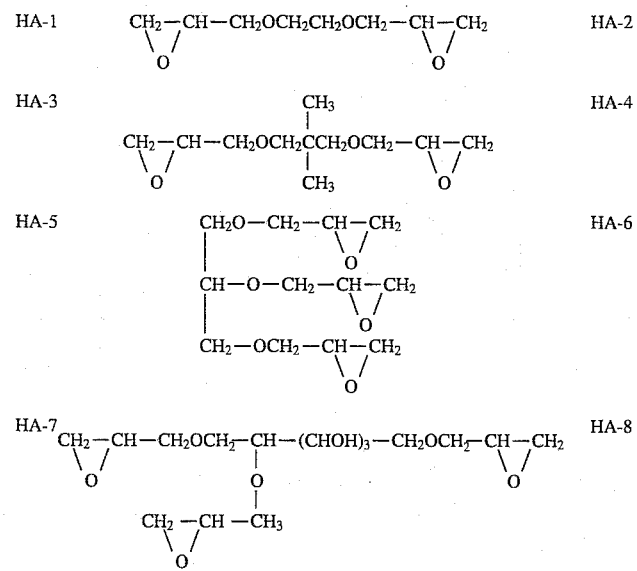

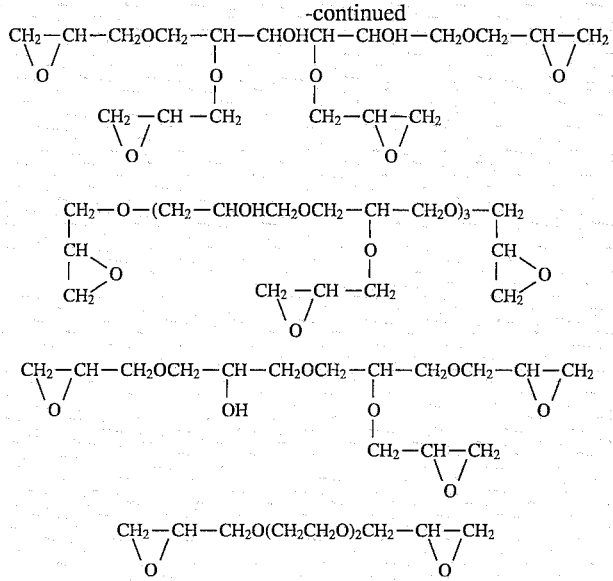

Peptide crosslinking reagents are taught in U.S. Pat. No. 4,942,068 and Ger. Pat. Appl. No. 4119982. Particularly preferred peptide reagents include, for example:

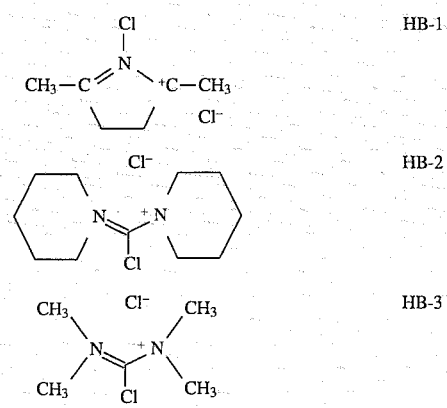

Vinyl sulfone crosslinking agents are well known in the art as exhibited in U.S. Pat. No. 5,045,441 and include, for example:

$$CH_2=CH-SO_2-CH_2OCH_2-SO_2-CH=CH_2 \quad \text{HC-1}$$

$$CH_2=CH-SO_2-(CH_2)_3-SO_2-CH=CH_2 \quad \text{HC-2}$$

$$CH_2=CH-SO_2-CH_2CHOHCH_2-SO_2-CH=CH_2 \quad \text{HC-3}$$

Aziridine crosslinking reagents are preferred, in part, due to their inactivity at pH above 7.0 and rapid activity at pH below 7.0. Therefore, the solution is stable in the liquid form with the present invention but reacts rapidly as the volatile amine is removed and the pH decreases.

Particularly preferred aziridines can be defined by the following formulas:

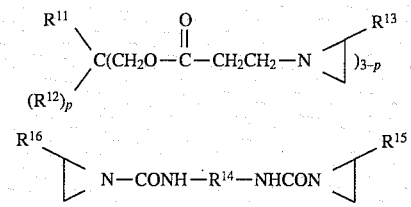

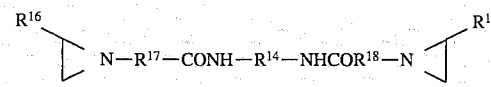

wherein $R^{11}$ and $R^{12}$ independently represent alkyl of 1–6 carbons either unsubstituted or substituted with —OH or halide; $R^{13}$ represents hydrogen or alkyl of 1 to 6 carbons; p is an integer of 0 or 1; $R^{14}$ is an alkyl of 2 to 6 carbons; $R^{15}$ and $R^{16}$ independently represent hydrogen or alkyl of 1 to 6 carbons; $R^{17}$ and $R^{18}$ independently represent a linkage or an alkyl of 1–10 carbons. Preferably $R^{17}$ and $R^{18}$ each represents a linkage. While not limited thereto, particularly preferred aziridine reagents include, for example:

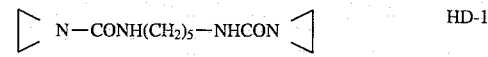
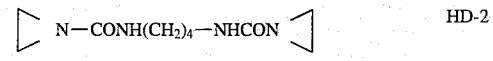
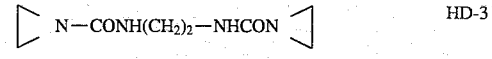
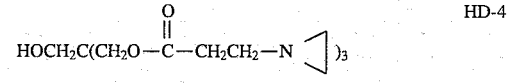
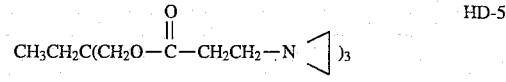
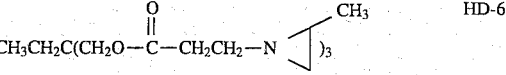

Exemplary teachings of antistatic coatings using an aziridine crosslinker are provided in U.S. Pat. Nos. 4,225,685; 4,701,403; 4,585,730; 4,960,687; 4,859,570; 4,916,011; 4,940,655; 5,077,185; 5,128,233 and 4,810,624.

The term "volatile amine" refers specifically to an amine which is capable of reacting with a hydrogen on the polymer to form an ammonium salt in aqueous solution but which is sufficiently volatile to evaporate as the water is removed from the coated film. The volatile amine must be sufficiently basic to raise the pH above 7.

Volatile amines can be defined by the formula:

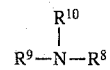

wherein $R^8$, $R^9$ and $R^{10}$ independently represent hydrogen or alkyl of 1–5 carbons. A preferred volatile amine is obtained when $R^8$, $R^9$ and $R^{10}$ are independently chosen from a group consisting of ethyl, methyl and hydrogen. In the present invention, the term amine is meant to include ammonia. The most preferred volatile amine is ammonia. The amount of volatile amine added should be sufficient to adjust the pH to at least 7.0, and preferably to a pH of 8.5 to 9.0 at ambient temperature.

The conductive layer of the present invention may contain a latex as known in the art. Latex which is applicable to the invention include copolymers of acrylates, or methacrylates esterified with an alkyl group having 2 to 6 carbon atoms. Typical latex polymers include, for example, methyl acrylate, ethyl acrylate, butyl acrylate, methyl methacrylate, ethyl methacrylate, and butyl methacrylate. Also useful is a latex which contains components of styrene, vinylidene chloride, acrylic acid, methacrylic acid, itaconic acid, itaconic acid esters or butadiene. Preferably, the latex comprises a carboxylic acid group.

Bactericides may be added to prevent bacteria growth. Preferred are Kathon®, neomycin sulfate, and others as known in the art. Generally, bactericides are more active at low pH.

It is preferable to apply, and dry-cure, a primer layer during the manufacture of the polyester support as taught by Alles in U.S. Pat. No. 2,779,684, or to apply a primer layer such as a mixed-polymer subbing composition of vinylidene chloride-itaconic acid, taught by Rawlins in U.S. Pat. No. 3,567,452, prior to the application of the antistatic coating. When polyethylene terephthalate is manufactured for use as a photographic support, the polymer is cast as a film, the mixed polymer subbing composition of Rawlins is applied to one or both sides and the structure is then biaxially stretched, optionally followed by coating of a gelatin subbing layer. Upon completion of stretching and the application of the subbing compositions, it is necessary to remove strain and tension in the support by a heat treatment comparable to the annealing of glass. Air temperatures of from 100° C. to 160° C. are typically used for this heat treatment, which is referred to as the post-stretch heat relax. If desired, one or both of the gelatin subbing layers can be replaced by the formulation of the present invention and thus, the facilities of heat treatment involved in support manufacture, when used for the application of dry-curing of the present invention serve a dual purpose and result in an increase in productivity and economy.

It is preferable to activate the surface of the support prior to coating to improve the coating quality thereon. The activation can be accomplished by corona-discharge, glow-discharge, UV-rays or flame treatment. Corona-discharge is preferred and can be carried out to apply an energy of 1 mw to 1 kw/m². More preferred is an energy of 0.1 w to 5 w/m².

It is a preferred application of the current invention to coat a photosensitive and/or radiation sensitive layer on the same support as the antistatic coating composition. The photosensitive layer can be on the same side of the support as the antistatic layer or on the opposite side thereof. Most preferred is a photosensitive layer coated supra to the antistatic layer.

The photosensitive and/or radiation sensitive layers useful with the present invention may be any which are well known for imaging and reproduction in fields such as graphic arts, printing, medical, and information systems. Particularly preferred photosensitive layers comprise silver halide grains the preparation of which is fully disclosed in U.S. Pat. No. 5,045,441; Research Disclosure, 1989, Item 308119, Page 993–1015; Research Disclosure, 1994, Item 36544, Page 501–541 and references cited in these references. Elements made according to this invention are free of physical defects such as unwanted haze and also show a reduced propensity to produce static. Costs of preparing structures as described can be reduced using a single antistatic layer which effectively retains its physical and electrical permanence. Photopolymer, diazo, vesicular image-forming compositions and other systems may be used in addition to silver halide. Photographic silver halide emulsions employing any of the commonly known silver halides, e.g., bromide, chloride, iodide, or mixtures thereof may be used. These may be of various content and be negative or positive working. The response of the silver halide may be enhanced and stabilized by such chemical agents as boranes, amines, polyethylene oxides, tetraazaindenes, benzotriazole, alkali halides, phenyl mercaptotetrazole, and gold, mercury or sulfur compounds. In addition, dyes, development modifiers, covering power polymers, surfactants, lattices, hardeners and other addenda known in the photographic art may be employed with the photographic silver halide emulsion.

EXAMPLES

The following examples are intended to demonstrate the invention and are not intended to be limiting in any way. Surface tension was measured using a Fischer tensiometer, pH was measured using a Cole-Parmer meter with a calomel electrode.

Example 1

A solution was prepared with. 18 g of HD-6 hardener, 1630 g of water and 600 g of a conductive crosslinking polymer (CCP-1) of the following structure:

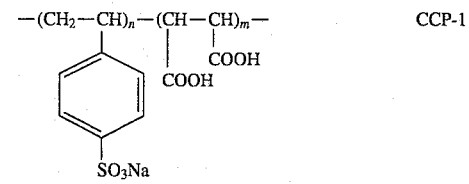

wherein n/m equals 3/1 and the PH was approximately 3.5. The solution was split into three samples. The pH was adjusted with a sodium hydroxide solution to a pH of approximately 6.09 in samples 1 and 2. Sample 2 was further adjusted to a pH of approximately 7.73 with ammonia solution. The pH of solution 3 was adjusted to approximately 7.73 using exclusively ammonia as ammonium hydroxide. To each solution was added 289 g of a solution containing 72.25 g of Rhoplex WL-81 (available from Rohm and Haas) and 216.75 g of water. The surface tension (ST) of the samples was measured and recorded in Table 1. The solutions were coated on a polyethylene terephthalate support with a conventional subbing layer as known in the art. A sample of 34 inches by 10 inches was analyzed for repellency spots. The number of repellency spots indicates the ability of the solution to wet the surface with a lower number of spots being preferred.

TABLE 1

| Sample | pH | ST | Spots |
|---|---|---|---|
| 1 | 6.08 | 41 | 33 |
| 2 | 7.73 | 38 | 15 |
| 3 | 7.73 | 38 | 12 |

This test indicated that the higher pH yielded an improved wetting of the surface. Ammonia was an improvement over an ionic base.

Example 2

A sample was prepared similar to that detailed in Example 1. The pH was adjusted to the level shown in the Table 2 with sodium hydroxide for Sample 1 and ammonia for Samples 2–5. Amphosol DM was added to Samples 1–4 at a level of 1.26 g per 3000 g of solution. The films were coated as in Example 1 and all were shown to have good adhesion by rubbing the film with a wet cloth. The good adhesion indicates that the crosslinking was sufficient which indicates that for Samples 3–5 the pH decreased as the ammonia evaporated. Spots were monitored as before and classified as large (>~¼") or small.

TABLE 2

| Sample | Large Spots | Small Spots | pH |
|---|---|---|---|
| 1 | 2 | 8 | 6.16 |
| 2 | 5 | 2 | 6.62 |
| 3 | 1 | 2 | 7.15 |
| 4 | 0 | 1 | 9.46 |
| 5 | 0 | 0 | 9.42 |

The results indicate that the coating quality can be excellent without surfactants and that the solution can be coated from a high pH solution, and still provide a crosslinked coating. The ability to coat at a high pH and still obtain adequate crosslinking is not available from the prior art. If the pH had remained above 7.0, as when NaOH is used exclusively, a catastrophic coating is obtained wherein the conductive polymer does not crosslink.

EXAMPLE OF PHOTOSENSITIVE ELEMENTS

A solution was prepared in accordance with Sample 5 of Example 2. The amounts of materials used per liter of water were:

| | |
|---|---|
| CCP-1 | 114 g of 25% aqueous solution |
| Rhoplex WL-81 | 14 g |
| HD-6 hardener | 4.5 g |

A small amount of polymethylmethacrylate beads was added. The pH was adjusted to 8.6 with ammonium hydroxide solution. A conductive substrate was prepared by coating the solution on each side of a polyethylene terephthalate support at a coating weight of 0.34 g of solids/m². A photosensitive element was prepared by coating a conventional tabular grain silver halide emulsion, as detailed in U.S. Pat. No. 5,108,887, on each side of the conductive substrate. A control sample was obtained by coating the identical photosensitive emulsion on a support which comprised a conductive coating which utilized sodium hydroxide to adjust the pH. Sensitometric performance and antistatic performance of the resulting photographic elements were identical, within experimental expectations.

We claim:

1. A conductive substrate for use in a photographic element, comprising:
   (a) a polyethylene terephthalate support;
   (b) 0.01 to 10 g/m² of a conductive layer coated on said support, said conductive layer having a low surface energy during coating and a high surface energy after coating, wherein said conductive layer is formed without surfactants or soaps from the reaction product of
   (i) a conductive crosslinkable polymer of formula

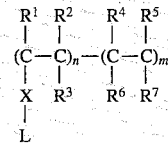

wherein:

X is a divalent linking group;

L is a charge carrying group;

$R^1$, $R^2$ and $R^3$ independently represent hydrogen, alkyl of 1–20 carbons, carboxyl, or alkylamine of 1–20 carbons;

$R^4$, $R^5$, $R^6$ and $R^7$ independently represent hydrogen, alkyl of 1–20 carbons, or a group capable of being crosslinked to form a film with the proviso that at least one of $R^4$, $R^5$, $R^6$ and $R^7$ comprises the group capable of being crosslinked to form a film; and n and m are chosen such that a ratio n/m is no less than 0.01 and no more than 100;

(ii) a volatile amine defined by

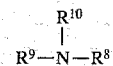

wherein;

$R^8$, $R^9$ and $R^{10}$ independently represent hydrogen, or an alkyl of 1–5 carbons; and (iii) a crosslinking agent wherein said crosslinking agent comprises at least one polyfunctional aziridine, said volatile amine being present in an amount sufficient to maintain the pH of said product at a level of at least 7.0, at ambient temperature during formation of said product.

2. The conductive substrate of claim 1 wherein said polyfunctional aziridine is chosen from a group consisting of:

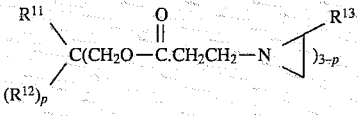

and

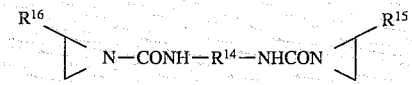

wherein $R^{11}$ and $R^{12}$ independently represent unsubstituted alkyl of 1–6 carbons, or alkyl of 1–6 carbons substituted with —OH or halide;

$R^{13}$ represents hydrogen or alkyl of 1 to 6 carbons;

p is an integer of 0 or 1;

$R^{14}$ is an alkyl of 2 to 6 carbons; and $R^{15}$ and $R^{16}$ independently represents hydrogen or alkyl of 1 to 6 carbons.

* * * * *